United States Patent
Lapis et al.

(10) Patent No.: US 11,697,456 B2
(45) Date of Patent: Jul. 11, 2023

(54) METHOD FOR CONTROLLING A MOTOR VEHICLE AT SLOW SPEEDS BY MEANS OF A DRIVE DIFFERENTIAL TORQUE ON THE REAR AXLE

(71) Applicants: thyssenkrupp Presta AG, Eschen (LI); thyssenkrupp AG, Essen (DE)

(72) Inventors: Leonard Lapis, Sennwald (CH); Kristof Polmans, Tarrenz (AT); Carlo Mario Miano, Eschen (LI)

(73) Assignees: THYSSENKRUPP PRESTA AG, Eschen (LI); THYSSENKRUPP AG, Eschen (LI)

( * ) Notice: Subject to any disclaimer, the term of this patent is extended or adjusted under 35 U.S.C. 154(b) by 0 days.

(21) Appl. No.: 17/793,124

(22) PCT Filed: Jan. 18, 2021

(86) PCT No.: PCT/EP2021/050884
§ 371 (c)(1),
(2) Date: Jul. 15, 2022

(87) PCT Pub. No.: WO2021/148334
PCT Pub. Date: Jul. 29, 2021

(65) Prior Publication Data
US 2023/0048018 A1  Feb. 16, 2023

(30) Foreign Application Priority Data

Jan. 23, 2020  (DE) ............... 10 2020 101 587.9

(51) Int. Cl.
*B60K 23/04* (2006.01)
*B62D 7/15* (2006.01)

(52) U.S. Cl.
CPC ........ *B62D 7/159* (2013.01); *B60K 2023/043* (2013.01); *B60W 2510/20* (2013.01);
(Continued)

(58) Field of Classification Search
CPC .. B62D 7/159; B62D 9/002; B60K 2023/043; B60W 2530/406; B60W 2510/20; B60W 2520/10; B60W 2710/207
See application file for complete search history.

(56) References Cited

U.S. PATENT DOCUMENTS 6,481,524 B1   11/2002  Ishida et al.
2009/0133954 A1  5/2009  Pohl
(Continued)

FOREIGN PATENT DOCUMENTS

CN  102105340 A  *  6/2011  ............ B62D 6/001
DE  4408747 A1   9/1994
(Continued)

OTHER PUBLICATIONS

English Translation of International Search Report issued in PCT/EP2021/050884, dated Apr. 12, 2021.

*Primary Examiner* — Justin Holmes
(74) *Attorney, Agent, or Firm* — thyssenkrupp North America, LLC

(57) ABSTRACT

A method can be used to control a steer-by-wire steering system for a motor vehicle that has two axles each with two wheels. Two front wheels can be steered by front-wheel steering and two rear wheels can be steered by rear-wheel steering. The motor vehicle includes a single wheel drive that is assigned to one of the two axles and drives the two wheels of the corresponding axle via a differential. The motor vehicle comprises an inboard braking system. The method involves checking the motor vehicle speed and activating rear-axle steering when a motor vehicle speed should be slower than 40 km/hr. With rear-axle steering active, the following steps are performed: deactivating front-wheel steering and rear-wheel steering, determining a reference position of a first steering rod via a reference wheel
(Continued)

Figure 1:
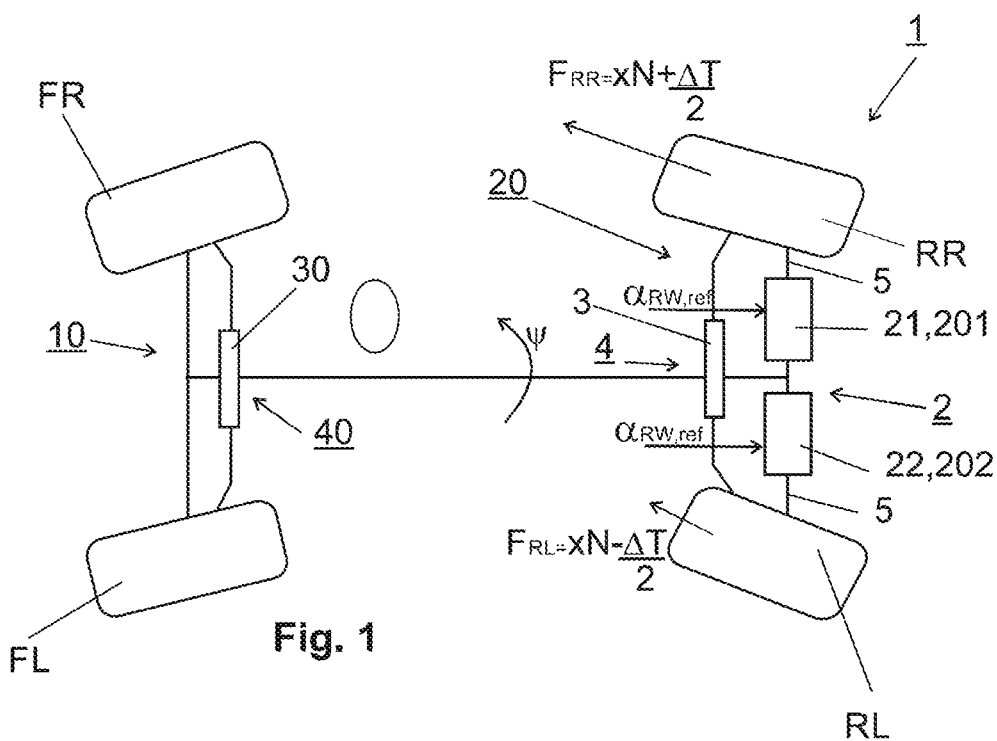

steering angle, determining a differential drive torque between the rear wheels to reach the reference position via a control unit.

10 Claims, 2 Drawing Sheets

(52) U.S. Cl.
CPC ... *B60W 2520/10* (2013.01); *B60W 2520/406* (2013.01); *B60W 2710/207* (2013.01)

(56) References Cited

U.S. PATENT DOCUMENTS

| | | |
|---|---|---|
| 2018/0194394 A1 | 7/2018 | Stratmann et al. |
| 2020/0039580 A1 | 2/2020 | Redeker et al. |

FOREIGN PATENT DOCUMENTS

| | | | | |
|---|---|---|---|---|
| DE | 10 2006 028 957 A1 | | 12/2007 | |
| DE | 10 2011 084 765 A1 | | 4/2013 | |
| DE | 10 2013 011 883 A1 | | 1/2015 | |
| DE | 10 2015 008 587 A1 | | 1/2017 | |
| DE | 10 2015 212 229 A1 | | 1/2017 | |
| DE | 102016211342 A1 | | 12/2017 | |
| DE | 102016224572 A1 | * | 6/2018 | ......... B60G 17/0195 |
| DE | 102018107612 A1 | * | 10/2019 | ................ B60L 1/00 |
| GB | 2412100 A | * | 9/2005 | ............ B60T 8/1755 |
| JP | S61200065 A | | 9/1986 | |
| JP | 2007269063 A | | 10/2007 | |
| WO | WO-2017001116 A1 | * | 1/2017 | ............ B60W 10/08 |
| WO | WO-2019002288 A1 | * | 1/2019 | ......... B60L 15/2036 |

* cited by examiner

METHOD FOR CONTROLLING A MOTOR VEHICLE AT SLOW SPEEDS BY MEANS OF A DRIVE DIFFERENTIAL TORQUE ON THE REAR AXLE

The present invention relates to a method for controlling a steer-by-wire steering system for a motor vehicle having the features of the preamble of claim 1 and to a motor vehicle which is designed to implement this method.

In steer-by-wire steering systems, the position of the steered wheels is not directly coupled to the steering wheel. The connection between the steering wheel and the steered wheels is via electric signals. The driver's steering intention is picked up by a steering angle sensor and, depending on the driver's steering intention, the position of the steered wheels is controlled by a steering actuator. No mechanical connection to the wheels is provided.

At slow speeds, for example below 40 km/hr, such as when maneuvering and parking the motor vehicle, for example, it is advantageous for rear-axle steering to be used to improve maneuverability and reduce the turning circle.

The problem addressed by the present invention is that of specifying a method for controlling a steer-by-wire steering system for a motor vehicle, which allows rear-axle steering at slow speeds without modifying the drive.

This problem is solved by a method for controlling a steer-by-wire steering system having the features of Claim 1 and by a steer-by-wire steering system which is designed to implement a method of this kind. Further advantageous embodiments of the invention can be inferred from the dependent claims.

A method for controlling a steer-by-wire steering system for a motor vehicle is therefore provided, wherein the motor vehicle comprises two axles with two wheels each, wherein the two front wheels can be steered by means of front-wheel steering and are connected to one another via a second steering rod of a steering system of the front-wheel steering; the two rear wheels can be steered by means of rear-wheel steering and are connected to one another via a first steering rod of a steering system of the rear-wheel steering, and the motor vehicle comprises a single wheel drive which is assigned to one of the two axles and drives the two wheels of the corresponding axle via a differential, wherein the motor vehicle comprises an inboard braking system, and the method comprises the following steps:
  checking the motor vehicle speed,
  in the event that a motor vehicle speed should be slower than a defined motor vehicle speed, activation of rear-axle steering,
  wherein with active rear-axle steering, the following steps are carried out:
  deactivation of rear-wheel steering,
  determination of a reference position of the first steering rod by means of a reference wheel steering angle of the rear wheels,
  determination of a differential drive torque between the two rear wheels, in order to reach the reference position by means of a control unit.

The low motor vehicle speed in accordance with the present solution is preferably slower than 50 km/hr, more preferably slower than 45 km/hr, and particularly preferably slower than 40 km/hr.

In addition, or alternatively, in order to check or monitor the motor vehicle speed, lateral acceleration of the motor vehicle is used as the parameter for activating the rear-axle steering.

Rear-axle steering in accordance with the present invention involves a torque vectoring rear-axle gear. Torque vectoring involves a drive torque being distributed between a left and a right vehicle wheel by means of a specially designed differential gear, so that understeering and oversteering are thereby prevented. Hence, a brake is applied to a wheel in an unstable driving situation, while the driving power is transmitted to the wheel which has the greatest yawing moment reduction; in other words, if there is understeering, the control system applies more driving power to the outer wheel via a separate clutch, so that the vehicle is "pushed into" the bend. Through an individual distribution of the drive torque between the wheels on the rear axle, the torque vectoring rear-axle gear produces a yawing moment—in other words, a moment about the vehicle's vertical axis—which can improve both agility and stability. By distributing the drive torque between the two wheels on the rear axle, an additional yawing moment (turning in) is produced, which supports the steering movement of the vehicle, particularly when cornering. In this way, the vehicle can be stabilized during rapid evasive manoeuvres, without brakes having to be applied to the wheels.

Rear-wheel steering in accordance with the present invention has a rear-wheel drive for controlling the rear wheels. The rear-wheel drive is arranged on a rear-wheel axle. The rear-wheel axle comprises, relative to a direction of travel, a left steerable rear wheel and a right steerable rear wheel, which are connected to one another via a rack gear of a rack and pinion steering gear, for example. During the rear-wheel steering deactivation step, the rear-wheel control is switched off, so that free movement of the two rear wheels is made possible.

The rear-axle steering is implemented without modification of an existing drive, in that a differential drive torque between the rear wheels displaces the first rack gear and produces a yawing moment about the vertical axis of the motor vehicle and thereby introduces steering torque. Steering via the rear axle makes the motor vehicle particularly maneuverable, which is especially advantageous when parking.

In one exemplary embodiment, the wheel drive is arranged on the front axle and the method comprises the following steps:
  generation of the differential drive torque between the two rear wheels by braking a rear wheel,
  increase in a torque provided by the wheel drive of the front axle to compensate for a loss of speed by the motor vehicle caused by the braking of the rear wheel being braked.

Calculation of the differential drive torque includes the chassis geometry, the properties of the brake system and the algebraic sign of the reference rack gear position, in order to determine a rear wheel to be braked and the braking pressure.

In a further embodiment, the wheel drive is a rear wheel drive with a single actuator and an open differential and the method comprises the following steps:
  generation of the differential drive torque between the two rear wheels by braking a rear wheel,
  increase in a torque provided by the wheel drive of the rear axle to compensate for a loss of speed by the motor vehicle caused by the braking of the rear wheel being braked.

In this case, the following equation preferably applies to a left-hand bend: $T_{RL}+T_{RR}=2*T_{RR}+T_{ped,br}$, where $T_{RL}$ and $T_{RR}$ are the torque of the left and right rear wheel and $T_{ped,br}$ is the braking torque introduced to the left rear wheel being braked. The following equation applies accordingly to a right-hand bend: $T_{RR}+T_{RL}=2*T_{RL}+T_{ped,br}$.

In a further exemplary embodiment, the wheel drive is a rear-wheel drive with two actuators, which each drive a rear wheel, and the method comprises the following steps:

generation of the differential drive torque between the two rear wheels through the introduction of different torques by the two actuators.

In a left-hand bend, the tractive force for the left rear wheel is then preferably xN−ΔT/2 and the tractive force for the right rear wheel xN+ΔT/2, where ΔT represents the differential drive torque. For a right-hand bend, the tractive force for the right rear wheel is preferably xN−ΔT/2 and the tractive force for the left rear wheel xN+ΔAT/2.

Quite generally, in the event that a motor vehicle speed is greater than the defined motor vehicle speed, it is advantageous for the steering gear of the rear axle steering to be locked in the straight-line position, so that good vehicle stability is achieved.

Locking preferably takes place via a clutch.

Quite generally, it may be provided that the reference wheel steering angle is determined by means of a steering torque introduced into a steering means by a driver or is prescribed by an autonomous or semi-autonomous driving mode. In the case of the semi-autonomous driving mode, which can also be referred to as the partially autonomous or semi-automatic driving mode, the vehicle is automatically parked, for example, and/or a lane-keeping function can be activated and/or longitudinal guidance of the vehicle, such as acceleration and braking, is undertaken by the corresponding assistance system, wherein the driver can constantly intervene in the driving operation, whereas in an autonomous driving mode, the vehicle is controlled fully automatically without any driver involvement.

Furthermore, the problem is solved by a motor vehicle which is set up to implement the previously described method. The motor vehicle preferably has a high caster and a low scrub radius. The position of the vertical steering axis defines the caster and the scrub radius. The scrub radius, or scrub radius path, denotes the distance in the longitudinal direction between the caster vertex (the point at which the steering pivot axis meets the road surface) and the wheel contact point. The wheel contact point normally lies behind the caster vertex (positive caster) in the direction of travel, so that the wheel trails behind the steering pivot axis. It therefore turns automatically in the desired direction of travel. As a result of the caster, a restoring torque occurs when there is a steering deflection. The restoring torque can be felt on the steering wheel when cornering. The driver is provided, along with the transverse acceleration, with a status indication on the cornering and on the contact between tyres and road. The caster or trail is preferably between 20 mm and 50 mm.

On steerable axles of the vehicle, the scrub radius denotes the horizontal distance between the mid-plane of the wheel and the point at which the spreading axis (steering pivot axis) meets the road. The scrub radius determines the strength and direction of the torque about the spreading axis during braking. The scrub radius preferably falls within a range of between 0 mm and 30 mm.

Figure 2:
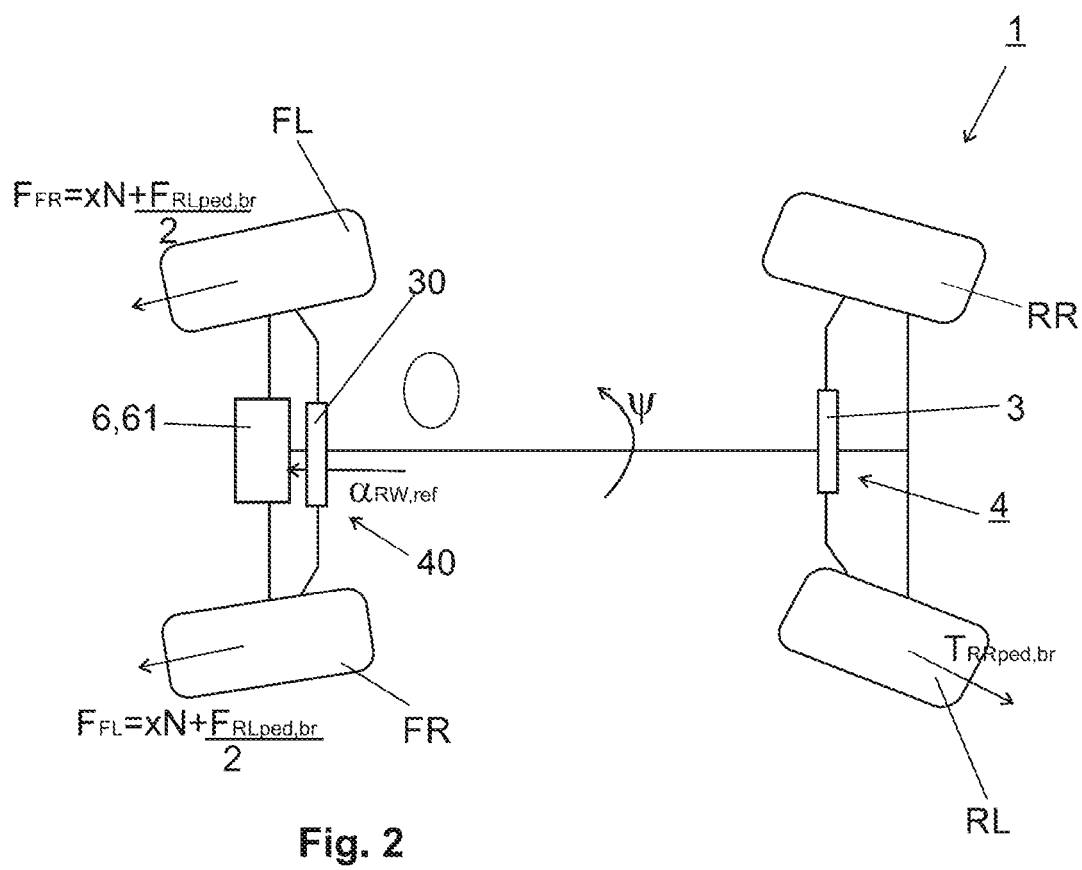
Figure 3:
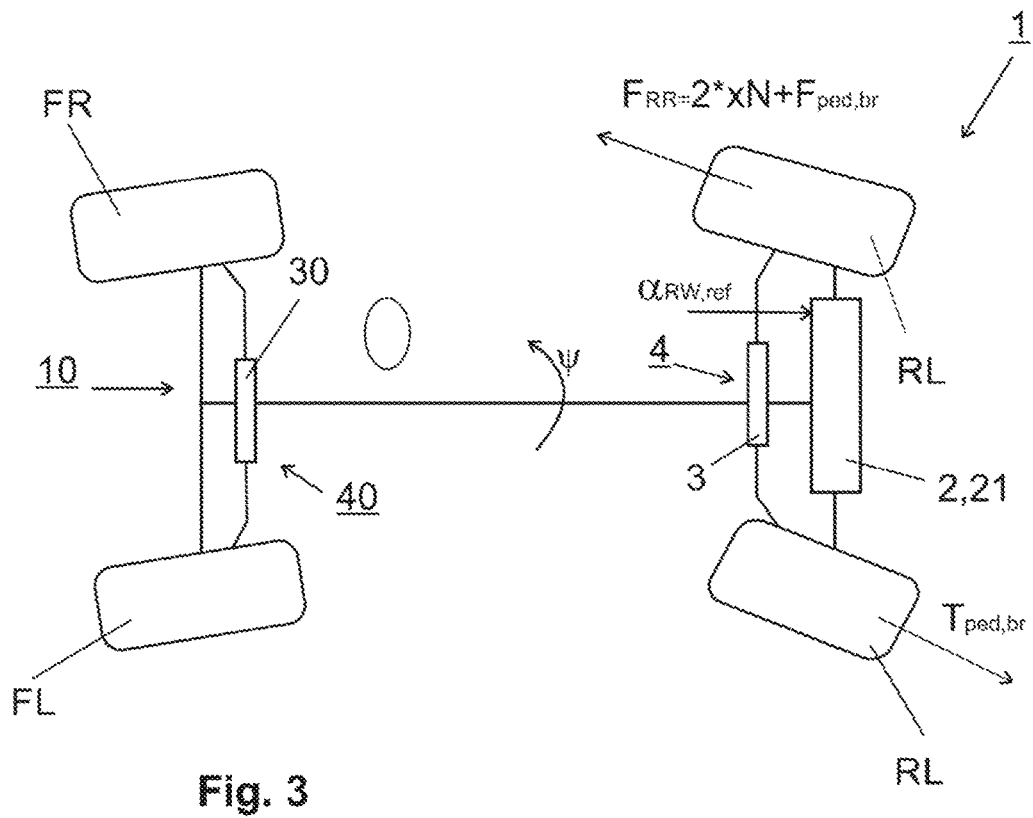
Figure 4:
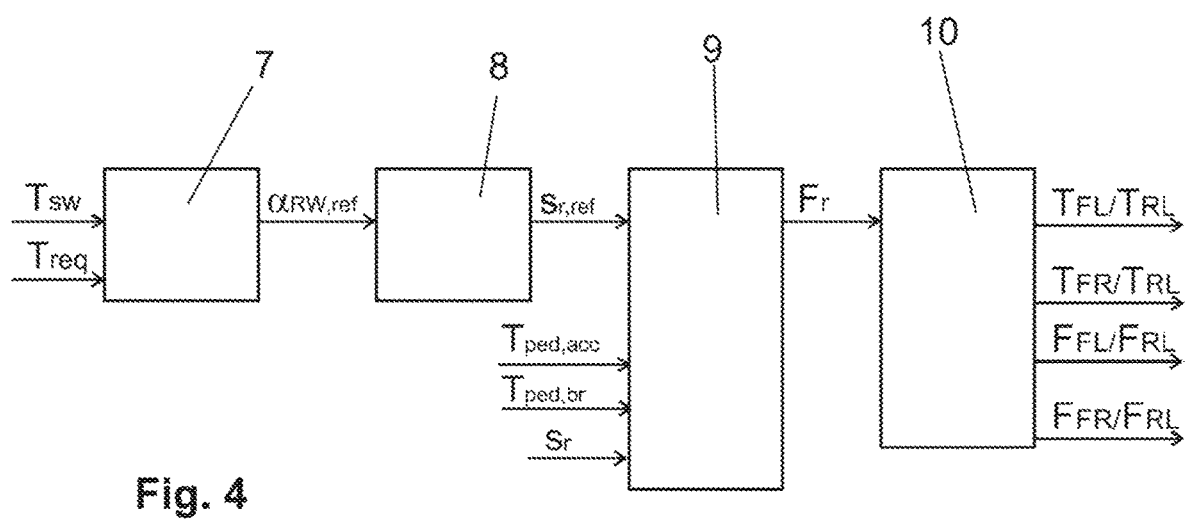

Preferred embodiments of the invention are explained in greater detail below with the help of the drawing. Identical, or functionally identical, components in this case are provided with the same reference signs shared between all the figures. In the drawings:

FIG. 1: shows a schematic representation of a motor vehicle with rear wheel drive-based torque vectoring, FIG. 2: shows a schematic depiction of a motor vehicle with front-wheel drive comprising a drive motor and rear-wheel brake-based torque vectoring, FIG. 3: shows a schematic representation of a motor vehicle with rear-wheel drive comprising a drive motor and rear wheel-based torque vectoring, and FIG. 4: shows a block diagram of a control system of the motor vehicle with rear axle-based torque vectoring.

In FIG. 1 a motor vehicle 1 with two axles 10,20 and four wheels FL,FR,RL,RR is schematically depicted, wherein only the rear wheels RL,RR are drivable (rear-wheel drive) and the drive 2 of the rear wheels RL,RR is arranged on a rear axle 20. The drive 2 has two separate actuators 21,22. A left wheel drive motor 202 is arranged on the left in the direction of travel and a right wheel drive motor 201 is arranged on the right in the direction of travel. The wheel drive motors 201,202 are each connected to the steerable rear wheels RL,RR via drive shafts 5. The steerable rear wheels RL,RR are connected to one another via a rack gear 3 of a rack and pinion steering gear 4. If the rack gear 3 is displaced transversely to the direction of travel to the right or left, the wheels RL,RR are pivoted about a pivot point in each case. The front wheels FL,FR are likewise steerable and connected to one another via a second rack gear 30 of a second rack and pinion steering gear 40.

The actuators 21,22 are controlled by means of a reference wheel steering angle $\alpha_{RW,ref}$ of the steerable rear wheels RL,RR. The rear wheels RL,RR are driven in such a manner that a differential torque AT occurs between the rear wheels FL,FR, which is proportionate to the reference wheel steering angle $\alpha_{RW,ref}$ or else a driver's steering intention. In other words, the reference wheel steering angle $\alpha_{RW,ref}$ f the steerable rear wheels FL,FR is incorporated in the control of the rear-wheel drive. When driving round a left-hand bend, as shown in FIG. 1, the tractive force for the left rear wheel is xN (e.g. 100 N)−ΔT/2 and the tractive force for the right rear wheel is xN+ΔT/2. The differential torque leads to a displacement of the rack gear 3 on the rear axle 20 and to a yawing moment ψ about the vertical axis of the motor vehicle.

FIG. 2 shows a further exemplary embodiment of the invention. The motor vehicle 1 has front-wheel steering and rear-wheel steering, and also front-wheel drive 6. The front wheels FL,FR of the front-wheel steering are connected to one another via a second rack gear 30 of a second rack and pinion steering gear 40. The rear wheels RL,RR of the rear-wheel drive are connected to one another via a first rack gear 3 of a first rack and pinion steering gear 4. The front-wheel drive 6 has a single actuator 61, in particular an electric motor, which drives the front wheels FL,FR via a differential. At slow speeds, in order to improve the maneuverability, a steering torque is provided by braking one of the rear wheels RL,RR. The braking system on the rear-wheel axle is arranged on the drivetrain. A braking torque generated by the braking system is transmitted via the drive shaft of the rear-wheel drive to the wheel being braked. The braking system is therefore referred to as an inboard braking system. Depending on the reference wheel steering angle $\alpha_{RW,ref}$ of the rear wheels RL,RR, a reference rack gear position $S_{R,ref}$ of the first rack gear 3 is calculated. The rack gear position is regulated by means of a control system which comprises arbitration software. This software incorporates the chassis geometry, the properties of the braking system and the algebraic sign of the reference rack gear position $S_{R,ref}$, in order to determine a rear wheel to be braked RR,RL, and the brake pressure required for the braking action. So that the motor vehicle 1 does not lose speed due to the braking action, the front wheel drive provides additional torque, which corresponds to the braking torque $T_{RRped,br}$ and makes up for the loss of speed. A position of an accelerator pedal of the motor vehicle, preferably an accelerator pedal angle, and also a position of a brake pedal, preferably a brake pedal angle, are relayed to the control system, in order to identify an acceleration or braking of the motor vehicle and therefore calculate the additional torque required.

FIG. 2 shows driving around a left-hand bend. The reference rack gear position $S_{R,ref}$ and the reference wheel steering angle $\alpha_{RW,ref}$ are used in calculating the braking torque $T_{RLped,br}$ to be applied by the left rear wheel RL.

Through braking of the one rear wheel, a yawing moment is produced about the vertical axis and the first rack gear 3 of the first rack and pinion steering gear 4 is displaced, as a result of which the motor vehicle 1 is deflected. The drive control of the front wheel drive 6 controls the right front wheel FR and the left front wheel FL accordingly, each of which applies a tractive force of xN (e.g. 100 N)+$F_{RLped,br}$/2, wherein $F_{RLped,br}$ is the force compensating for the braking torque $T_{RLped,br}$. The front-axle steering can be supported by a torque generated by means of the actuator. The motor vehicle is steered by means of rear-wheel brake-based torque vectoring, without a drive on the rear axle.

A motor vehicle 1 with rear-wheel drive 2 and front-wheel and rear-wheel steering are depicted in FIG. 3. The front wheels FL,FR of the front-wheel steering are connected to one another via a second rack gear 30 of a second rack and pinion steering gear 40. The rear wheels RL,RR of the rear-wheel steering are connected to one another via a second rack gear 3 of a second rack and pinion steering gear 4. The rear wheel drive has a single actuator 2, in particular an electric motor, which drives the rear wheels RL,RR via an open differential (without a locking mechanism) or a partially open differential.

In order to increase maneuverability at slow speeds, a steering torque and a yawing moment about the vertical axis of the motor vehicle are provided by braking one of the rear wheels RL.

Depending on the reference wheel steering angle $\alpha_{RW,ref}$, a reference rack gear position $S_{R,ref}$ of the first rack gear 3 is calculated. The rack gear position is regulated by means of a control system which comprises arbitration software. This software uses the chassis geometry, the properties of the braking system and the algebraic symbol of the reference rack gear position $S_{R,ref}$ to determine a rear wheel which is to be braked and the brake pressure. So that the motor vehicle 1 does not lose speed on account of the braking action, the actuator 21 of the rear wheel drive 2 provides additional torque which compensates for the loss of speed. A position of an accelerator pedal of the motor vehicle, preferably an accelerator pedal angle $\alpha$, and also a position of a brake pedal, preferably a brake pedal angle, are relayed to the control system, so as to identify acceleration or braking of the motor vehicle, in order to calculate the additional torque.

The following equation applies to the left-hand bend depicted in FIG. 3:

$T_{RL}+T_{RR}=2*T_{RR}+T_{RLped,br}$, where $T_{RL}$ and $T_{RR}$ are the torque of the left and right rear wheel and $T_{RLped,br}$ is the braking torque applied to the rear wheel RL to be braked. $F_{RR}$ is therefore equal to $2*xN+F_{RLped,br}$.

The braking system on the rear wheel axle is arranged on the drivetrain. A braking torque generated by the braking system is transmitted via the drive shaft of the rear wheel drive 2 to the wheel to be braked RL. The braking system is therefore referred to as an "inboard braking system". The forces acting on the wheels are therefore mainly generated from the torque transmitted via the drive shaft and the frictional force of the point of contact of the wheel with the road.

The resulting force acts on the centre of the wheel, as a result of which a stronger steering torque can be achieved with a smaller torque than is traditionally the case with a larger king pin inclination.

In this case, the rear-wheel brakes-based torque vectoring represents particularly favourable and simple rear-axle steering which allows for agile control of the motor vehicle at a low speed.

At higher speeds, in particular at speeds of over 40 km/hr, it is preferable for the steering gear of the rear-axle steering to be locked in the straight-line position (mid-position), in order to achieve steady handling. The locking is preferably achieved by means of a locking mechanism for the rear axle, which releases said rear axle or locks it, depending on the defined operating states of the vehicle. In particular, the steering should be locked when a predefined speed of the vehicle is exceeded.

A drive torque difference between the left and right rear wheel for controlling the motor vehicle is used when a predefined vehicle speed is exceeded and/or a maximum lateral acceleration is exceeded.

In order to achieve a maximum effect through the torque difference, the suspension of the wheels and the steering geometry resulting from this must be selected accordingly. For this purpose, the caster and the scrub radius, in particular, must be defined, in order to maximize the yawing moment resulting from the differential torque.

FIG. 4 shows a block diagram of a control system of the motor vehicle with rear axle-based torque vectoring for slow vehicle speeds. In a first unit 7, the steering torque $T_{SW}$ introduced into a steering wheel by the driver or a reference torque $T_{req}$ required by an autonomous driving mode are converted into a reference wheel steering angle $\alpha_{RW,ref}$ of the rear wheels RL,RR. A second unit 8 determines from the reference wheel steering angle $\alpha_{RW,ref}$ a reference rack gear position $S_{R,ref}$. The reference rack gear position $S_{R,ref}$ is compared with a measured actual rack gear position $S_R$. The rack gear force $F_{Rack}$ is determined in a third unit 9 from the reference rack gear position $S_{R,ref}$ and the braking torque $T_{ped,br}$ and/or the acceleration torque $T_{ped,acc}$ of the rear wheels. In a fourth unit 10, the way in which the motor vehicle and the vehicle wheels behave with a constant speed and cornering, acceleration and cornering and when braking while cornering is then determined from this and subsequently implemented for the respective vehicle state.

As disclosed in the previously described embodiments, the drive may be arranged on the front axle or the rear axle. The drive comprises at least one actuator.

A steering action can be initiated both by a driver by turning a steering wheel or by moving another kind of steering means, and also by a control system of an autonomous or semi-autonomous motor vehicle.

The invention claimed is:

1. A method for controlling a steer-by-wire steering system for a motor vehicle, wherein the motor vehicle comprises two axles with two wheels each, wherein two front wheels are steerable by way of front-wheel steering and are connected to one another via a second steering rod of a steering system of the front-wheel steering, wherein two rear wheels are steerable by way of rear-wheel steering and are connected to one another via a first steering rod of a steering system of the rear-wheel steering, the motor vehicle comprising a single wheel drive that is assigned to one of the two axles and that drives the two wheels of the corresponding axle via a differential, wherein the motor vehicle comprises an inboard braking system, the method comprising:

checking the motor vehicle speed;

activating rear-axle steering when the motor vehicle speed should be less than a defined motor vehicle speed; and performing the following steps with the rear-axle steering active:

deactivating rear-wheel steering, determining a reference position of the first steering rod by way of a reference wheel steering angle of the rear wheels, and determining a differential drive torque between the two rear wheels to reach the reference position by way of a control unit.

2. The method of claim 1 wherein the single wheel drive is disposed on a front axle of the two axles, the method comprising:

generating the differential drive torque between the two rear wheels by braking one of the rear wheels; and increasing a torque provided by the single wheel drive to compensate for a loss of speed by the motor vehicle caused by the braking of the one of the rear wheels.

3. The method of claim 1 wherein the single wheel drive is a rear-wheel drive with a single actuator and an open differential, the method comprising:

generating the differential drive torque between the two rear wheels by braking one of the rear wheels; and increasing a torque provided by the single wheel drive to compensate for a loss of speed by the motor vehicle caused by the braking of the one of the rear wheels.

4. The method of claim 3 comprising applying the following through a left-hand bend: $T_{RL} \pm T_{RR} = 2*T_{RR} \pm T_{ped,br}$, wherein $T_{RL}$ and $T_{RR}$ are torques of the left and right rear wheels and $T_{ped,br}$ is a braking torque introduced to the left rear wheel, which is the one of the rear wheels that is being braked.

5. The method of claim 1 wherein the single wheel drive is a rear-wheel drive with two actuators, wherein each actuator drives a rear wheel, the method comprising generating the differential drive torque between the two rear wheels by introducing different torques by the two actuators.

6. The method of claim 5 comprising applying the following through a left-hand bend: a tractive force for the left rear wheel is $xN-\Delta T/2$ and a tractive force for the right rear wheel is $xN+\Delta T/2$.

7. The method of claim 1 comprising locking a steering gear of the rear-axle steering in a straight-line position when the motor vehicle speed is greater than the defined motor vehicle speed.

8. The method of claim 1 comprising determining the reference wheel steering angle with a steering torque that is introduced into a steering means by a driver.

9. The method of claim 1 comprising specifying the reference wheel steering angle by an autonomous or semi-autonomous driving mode.

10. A motor vehicle that is capable of and configured to perform the method of claim 1.

* * * * *